United States Patent
Kim et al.

(10) Patent No.: US 7,322,583 B2
(45) Date of Patent: Jan. 29, 2008

(54) ERGONOMIC TELESCOPING HANDLE ASSEMBLY FOR WHEELED LUGGAGE

(75) Inventors: Daniel Kim, Appleton, WI (US); Doug Golenz, Louisville, CO (US)

(73) Assignee: JanSport Apparel Corp., Wilmington, DE (US)

( * ) Notice: Subject to any disclaimer, the term of this patent is extended or adjusted under 35 U.S.C. 154(b) by 470 days.

(21) Appl. No.: 11/034,876

(22) Filed: Jan. 14, 2005

(65) Prior Publication Data

US 2005/0173896 A1   Aug. 11, 2005

Related U.S. Application Data

(60) Provisional application No. 60/536,233, filed on Jan. 14, 2004.

(51) Int. Cl.
  *B62B 7/00*   (2006.01)
(52) U.S. Cl. ............ 280/37; 280/87.05; 280/278; 280/206; 280/335; 280/639; 280/638; 280/20; 280/32.6; 280/47.25; 280/47.18; 280/47.21; 280/47.27; 280/47.33
(58) Field of Classification Search .......... 280/37, 280/87.05, 278, 206, 335, 639, 638, 20, 32.6, 280/47.25, 47.18, 47.21, 47.27, 47.33
See application file for complete search history.

(56) References Cited

U.S. PATENT DOCUMENTS

| | | | |
|---|---|---|---|
| 1,278,552 A | 9/1918 | Allmand | |
| 3,805,929 A | 4/1974 | Kuwayama | |
| 4,561,526 A | 12/1985 | Winter et al. | |
| 4,928,800 A | 5/1990 | Green et al. | |
| 5,075,925 A | 12/1991 | Maloney | |
| 5,253,739 A | 10/1993 | King | |
| D352,826 S | 11/1994 | Rao | |
| 5,447,261 A | 9/1995 | Mitomi et al. | |
| 5,533,601 A | 7/1996 | Wang | |
| D373,246 S | 9/1996 | Stokes et al. | |
| 5,560,458 A | 10/1996 | Franklin et al. | |
| 5,566,797 A | 10/1996 | Van Himbeeck | |
| 5,588,569 A | 12/1996 | Mitomi et al. | |
| D383,603 S | 9/1997 | Pedlar | |
| D383,905 S | 9/1997 | Stokes et al. | |
| 5,762,169 A | 6/1998 | Deliman et al. | |
| 5,813,504 A * | 9/1998 | Iny et al. | 190/116 |
| 5,924,533 A | 7/1999 | Cnockaert et al. | |
| 5,943,936 A | 8/1999 | Deliman et al. | |
| 6,009,598 A * | 1/2000 | Chang | 16/113.1 |
| 6,032,771 A | 3/2000 | Pedrini | |
| D422,409 S | 4/2000 | Klenner et al. | |
| D425,301 S | 5/2000 | Sagol | |

(Continued)

*Primary Examiner*—Christopher P. Ellis
*Assistant Examiner*—Cynthia F. Collado
(74) *Attorney, Agent, or Firm*—Kenyon & Kenyon LLP (57) ABSTRACT

The present invention is directed to a wheeled luggage item with an ergonomic telescopic handle assembly. The ergonomic telescoping handle assembly of the present invention allows a user to use the luggage using just one hand. Furthermore, the ergonomic telescoping handle assembly shifts the weight of the bag onto the bag, rather than the user's arm, reducing strain on the user's arm, and it provides for a greater space between the user's heel and the bag, reducing the chance that the user will kick the bag while walking. Finally, the ergonomic telescoping handle assembly of the present invention is stored compactly within the luggage, maximizing the volume available within the luggage for storage of personal items.

15 Claims, 9 Drawing Sheets

U.S. PATENT DOCUMENTS

| | | |
|---|---|---|
| 6,079,527 A | 6/2000 | Kuo |
| 6,148,477 A | 11/2000 | Cheng |
| 6,179,101 B1 | 1/2001 | Lin |
| 6,186,295 B1 | 2/2001 | Lin et al. |
| 6,202,254 B1 | 3/2001 | Ezer |
| 6,301,746 B1 | 10/2001 | Myers et al. |
| 6,305,514 B1 | 10/2001 | Lin et al. |
| 6,317,924 B1 | 11/2001 | Gallagher |
| D454,430 S | 3/2002 | Sijmons |
| 6,357,567 B1 | 3/2002 | Tsai |
| 6,385,816 B1 | 5/2002 | Baldas et al. |
| 6,389,645 B1 | 5/2002 | Polidoro |
| 6,408,996 B1 | 6/2002 | Lin |
| D462,169 S | 9/2002 | Giovanni |
| 6,484,362 B1 | 11/2002 | Kuo |
| 6,505,720 B1 | 1/2003 | Tsai |
| 6,508,344 B1 | 1/2003 | Lu |
| 6,561,328 B1 | 5/2003 | Huang |
| 6,564,426 B1 * | 5/2003 | Wang ........................ 16/113.1 |
| D477,916 S | 8/2003 | Nykoluk |
| 2002/0014382 A1 * | 2/2002 | Kuo ........................... 190/115 |
| 2002/0116790 A1 | 8/2002 | Walker |
| 2002/0145018 A1 | 10/2002 | Godshaw et al. |
| 2003/0000785 A1 | 1/2003 | Miller et al. |
| 2003/0000786 A1 | 1/2003 | Lau |
| 2003/0014837 A1 | 1/2003 | Tsai |
| 2003/0015383 A1 | 1/2003 | Tsai |
| 2003/0079950 A1 | 5/2003 | Lin et al. |
| 2003/0084543 A1 | 5/2003 | Sadow |
| 2003/0085089 A1 * | 5/2003 | Lin et al. ................... 190/115 |
| 2003/0085540 A1 | 5/2003 | Sadow |
| 2003/0102195 A1 | 6/2003 | Mittleman et al. |
| 2003/0106755 A1 | 6/2003 | Wang |
| 2003/0132080 A1 * | 7/2003 | Dababneh .................. 190/115 |
| 2003/0192146 A1 * | 10/2003 | Chang ....................... 16/113.1 |

* cited by examiner

ERGONOMIC TELESCOPING HANDLE ASSEMBLY FOR WHEELED LUGGAGE

CROSS-REFERENCE TO RELATED APPLICATIONS

This invention claims the benefit under 35 U.S.C. § 119(e) of U.S. Provisional Application No. 60/536,233 filed Jan. 14, 2004, which is herein incorporated by reference in its entirety.

FIELD OF THE INVENTION

The present invention relates generally to wheeled luggage, and more particularly, to improved ergonomic telescoping handle assemblies for use on luggage and similar wheeled items, such as brief cases, instrument cases, document bags, garment bags, sports bags, and the like.

BACKGROUND OF THE INVENTION

Over the years, wheeled luggage has developed from its early stages, with a single, non-retractable handle (such as that depicted in U.S. Pat. Nos. 3,805,929 and 4,561,526) to the more recent developments, including the development of telescoping handles (such as depicted in U.S. Pat. No. 5,253,739). The majority of wheeled luggage available to the public today have a pair of spaced wheels mounted on the bottom, widthwise edge of the case. This allows for the luggage to be rolled with the lengthwise edge of the case extending up, thereby minimizing the amount of room necessary to accommodate the luggage (an important feature when transporting the luggage up an escalator or through the narrow aisle of an airplane).

One problem associated with the wheeled luggage currently available is that it can often be uncomfortable to use. The angle at which the luggage is pulled can cause a person with longer legs to bump the back of his heels with the luggage. Furthermore, the handle itself can be uncomfortable to grip, and the positioning of the handle can cause strain on the user's arm.

Several attempts have been made to provide a more ergonomic wheeled luggage. U.S. Pat. No. 6,301,746, to Myers et al., provides a handle assembly for wheeled luggage. The Myers et al. handle assembly has two handles: a primary handle and a secondary handle. The secondary handle folds up into two positions, either perpendicular to the telescoping tubes or at a 180° angle. When folded down, the primary and secondary handles can be pushed down into the luggage, however the storage of the handles requires a large cavity, which reduces the amount of space available for storing personal items in the luggage. Furthermore, although each of the handles can be used for towing the luggage (providing the user with some flexibility in use), each only provides two ways of gripping the handle: grasping around the handle, with the palm either facing toward the body or the palm facing away from the body. This configuration, although comfortable for some, may be uncomfortable for those who prefer a grip that allows the user's arm to be parallel with the handle.

U.S. Patent Application Publication No. 2003/0132080, to Dababneh, attempted to solve the deficiencies of Myers et al. However, Dababneh has disadvantages. The handle depicted by Dababneh only allows for one means of gripping: with the hand grasped around a handle which is perpendicular to the axis of the wheels. Again, although this may be comfortable to some, it would not be comfortable to those who prefer to tow the luggage with their hand grasped around a handle that is not perpendicular to the axis of the wheels. Furthermore, although the handle apparently folds flush into the luggage, in the embodiment shown in which the handle folds upwards from the adjustable tube, if the luggage were to fall down onto the handle, the handle likely would break. In the embodiment shown, in which the handle and adjustable tube are pulled up from the luggage, and subsequently the handle is rotated about a pivot and center pin, the two parts of the adjustable tube again would likely break if the luggage were to fall onto the handle grip.

The present invention solves the deficiencies in the art by providing an adjustable, ergonomically correct telescoping handle assembly. The handle assembly of the present invention is stored (at a 6 o'clock position) flush within the luggage. The handle is stored in such a way as to be compact, minimizing the amount of room necessary for storage of the handle, thereby maximizing the volume of the container remaining for storage of personal items. Furthermore, the handle rotates up from a telescoping tube with the use of a hinge. The hinge allows the handle to be used in multiple positions. In one embodiment, the hinge allows the handle to be used in two positions: nearly perpendicular to the telescoping tubes (at a 2 o'clock position) or parallel to the telescoping tubes (at a 12 o'clock position). If the handle is being used in the nearly perpendicular position, and the luggage were to fall with the impact being taken by the handle, the handle would automatically adjust to its default position: parallel to the telescoping tube (at the 12 o'clock position). The hinge also allows the handle to be stored at an approximately 6 o'clock position. The telescoping handle assembly of the present invention shifts the weight of the bag onto the bag, rather than the user's arm, reducing strain on the user's arm. Furthermore, it provides for a greater space between the user's heel and the bag, reducing the chance that the user will kick the bag while walking, and it maximizes the interior volume of the luggage available for storing personal items.

SUMMARY OF THE INVENTION

It is a primary object of the present invention to provide a wheeled luggage item that is ergonomic, reduces strain on a user's arm, and provides for a greater space between the user's heel and the wheeled luggage item.

It is another object of the present invention to provide a luggage item, comprising a container substantially in the shape of a rectangle (including a front side, a back side, a left side, a right side, and a top and a bottom surface) with an attached wheel assembly and an ergonomic telescoping handle assembly coupled to the container. The ergonomic telescoping handle assembly comprises at least one, at least two, at least three, or four or more telescoping tubes extendible from the top surface of the container. The at least one, at least two, at least three, or four or more telescoping tubes comprises at least one set, at least two sets, at least three sets, or four or more sets of telescoping tube pins, and may further comprise at least one set, at least two sets, at least three sets, or four or more sets of telescoping tube pin holes. On top of the at least one telescoping tube is a gooseneck base for a handle assembly. Positioned between the at least one telescoping tube and the gooseneck base may be a telescoping tube pin release button that, when pressed, releases the telescoping tube pins from the telescoping tube pin holes, and on top of the telescoping tube pins release button is a gooseneck base for a handle assembly. A handle grip for the handle assembly is coupled to the gooseneck base by a hinge that allows the handle grip to pivot into at least one, at least two, at least three, or four or more selectable engageable fixed positions. The handle grip may be any shape. The handle grip of the present invention is preferably substantially T-shaped, with the base of the T coupled to the gooseneck base via the hinge. A hinge release button may be located on the handle grip, preferably on the T shaped top of the handle grip, and when pressed releases the hinge, allowing the handle grip to pivot into a different engageable fixed position. The luggage item of the present invention may further comprise an ergonomic telescoping handle assembly housing that allows the ergonomic telescoping handle assembly to be stored substantially flush with the outside of the container. A telescoping handle assembly release button may be present on top of the ergonomic telescoping handle assembly housing that, when pressed, will release the ergonomic telescoping handle assembly from its stored position.

It is yet another object of the present invention to provide a luggage item, similar to that discussed immediately above, but wherein the ergonomic telescoping handle assembly comprises two sets of at least one telescoping tube. Each set of at least one telescoping tube comprises at least one, at least two, at least three, or four or more sets of telescoping tube pins, and may further comprise at least one, at least two, at least three, or four or more sets of telescoping tube pin holes. On top of each of the top telescoping tubes is a gooseneck base for a handle assembly. Between each of the sets of at least one telescoping tube and each of the gooseneck bases may be located a telescoping tube pin release button that, when pressed, releases the telescoping tube pins from the telescoping tube pin holes. The handle grip is in a substantially U shape, with each of the tops of the U-shaped handle grip coupled to one of the gooseneck bases by a hinge which allows for the handle grip to pivot into at least one, at least two, at least three, or four or more selectable engageable fixed positions. A hinge release button may be located on the bottom of the U-shaped handle grip, and when pressed would release the hinges, allowing the handle grip to pivot into a different engageable fixed position. The luggage item of the present invention may further comprise an ergonomic telescoping handle assembly housing that allows the ergonomic telescoping handle assembly to be stored substantially flush with the outside of the container. A telescoping handle assembly release button may be present on top of the ergonomic telescoping handle assembly housing that, when pressed, will release the ergonomic telescoping handle assembly from its stored position.

It is yet a further object of the present invention to provide a luggage item, similar to that described immediately above, but wherein the handle grip is in the shape of a Y. In an embodiment, each of the tops of the Y are coupled to one of the gooseneck bases by a hinge which allows for the handle grip to pivot into at least one, at least two, at least three, or four or more selectable engageable fixed positions. In a preferred embodiment, each of the tops of the Y are coupled to one of the gooseneck bases by a hinge which allows for the handle grip to pivot into at least three selectable engageable fixed positions. A hinge release button may be located on the bottom of the base of the Y-shaped handle grip, and, when pressed, releases the hinges, allowing the handle grip to pivot into a different engageable fixed position.

DETAILED DESCRIPTION

Figure 1:
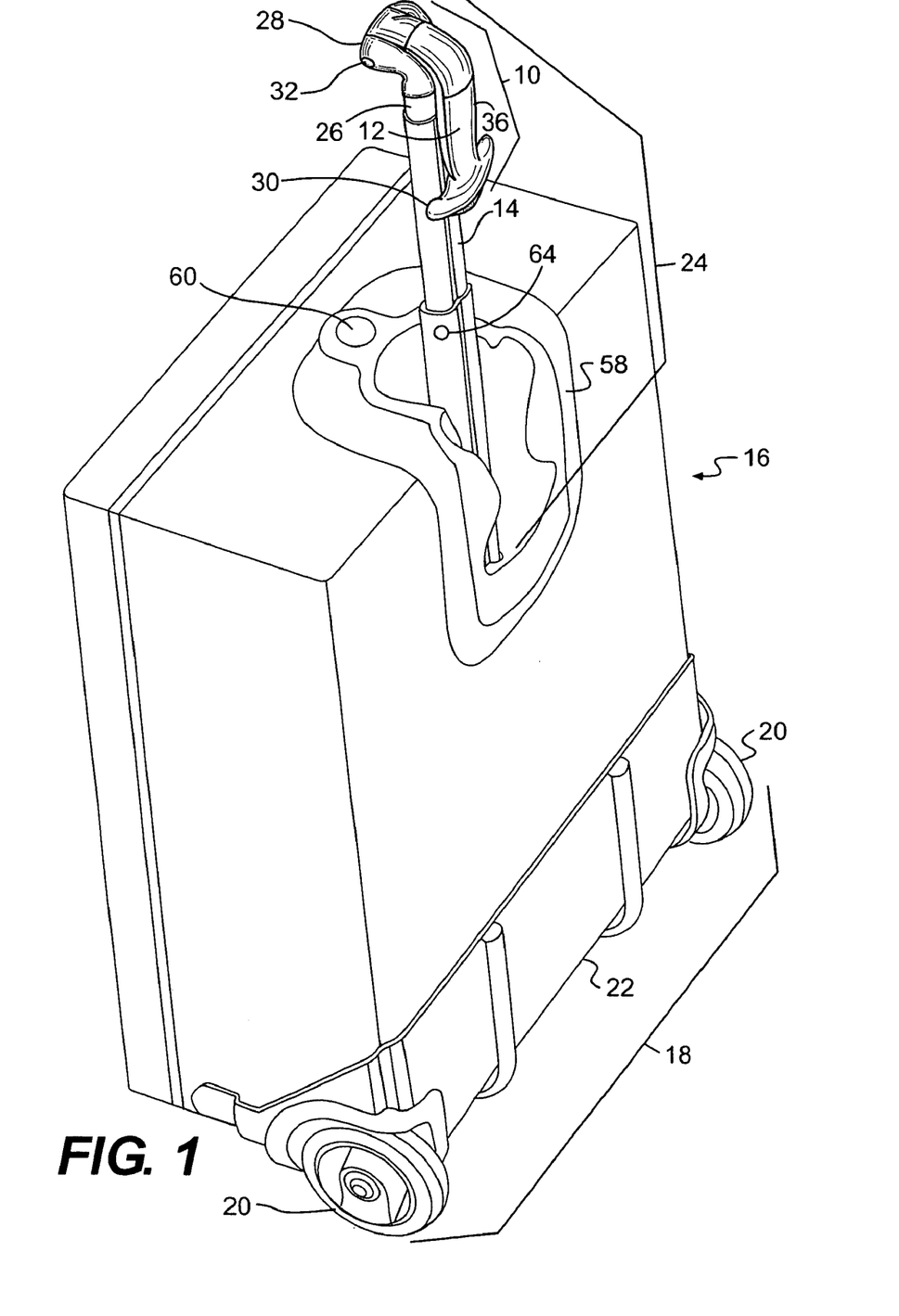
FIG. 1 illustrates one embodiment of the wheeled luggage of the present invention with the ergonomic telescoping handle assembly, wherein the telescoping tubes are in a partially up position, and the handle grip is in a down position.

As depicted in FIG. 1, which depicts a preferred embodiment of the present invention, the improvements of the present invention are described without limitation in conjunction with a wheeled luggage item, 16. Although shown as a rigid body or case, it is anticipated that the wheeled luggage item body or case may be a semi-rigid or soft body case or bag of various configurations, for various uses (such as transporting large musical instruments, sports equipment, personal items, etc.). The wheeled luggage item, 16, has a wheel assembly, 18. The wheel assembly may be as pictured, with wheels, 20, and a plastic wheel assembly kick place, 22, that protects the wheels and the bottom of the luggage item, 16. Alternatively, the wheel assembly may take any form known to one of skill in the art, such as wheels protected by individual wheel housings; wheels located more towards the center of the bottom of the luggage (between the back of the luggage item and the bottom of the luggage item) as opposed to the side of the luggage item (located where the back, side and bottom of the luggage item meet, as depicted in the picture); etc. The wheeled luggage item may be in any shape. The wheeled luggage item, 16, is preferably substantially in the shape of a rectangle. By "substantially in the shape of a rectangle" it is meant that the luggage item includes a front side, a back side, a left side, a right side, a top and a bottom surface, and the edges of the luggage may be squared or rounded (such that a cross-section of the luggage is any shape, including rectangular, square or oval shaped).

The improvements of the present invention relate to an ergonomic telescoping handle assembly, 24, mounted to the back surface of the wheeled luggage item, 16. The ergonomic telescoping handle assembly comprises at least one telescoping tube, 14; and a handle grip assembly, 10, comprising a gooseneck base, 28, and a handle grip, 12. Although depicted in the Figures as facing forward (extending over the luggage), the gooseneck base, 28, may be turned around such that it extends backwards. Furthermore, the distance that the gooseneck base, 28, extends, although depicted as approximately 1½ inches, may vary. The shape of the gooseneck base, 28, allows the handle grip, 12, to wrap onto the telescoping tube, 14, for easy and compact storage.

By the phrase "at least one telescoping tube" it is meant that there is at least one tube that is moveable in a vertical direction. There may be one or more stable tubes within the luggage (not seen by the user) in which the at least one telescoping tube moves.

Figure 6A:
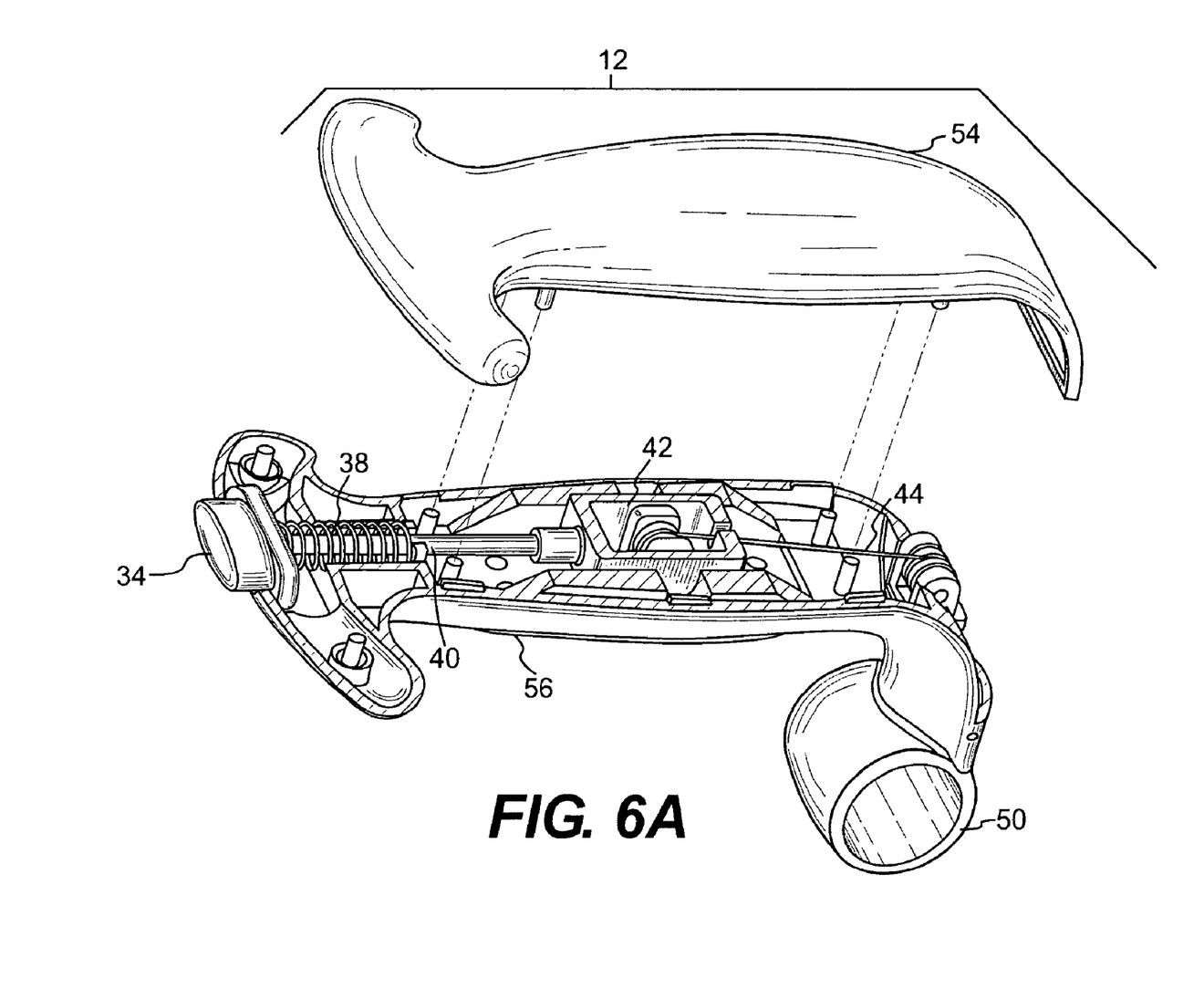
FIGS. 6A and 6B illustrate exemplary inside mechanics of the handle grip of the ergonomic telescoping handle assembly of the present invention, showing the components necessary for the handle release button to release the handle from its various fixed positions.
Figure 6B:
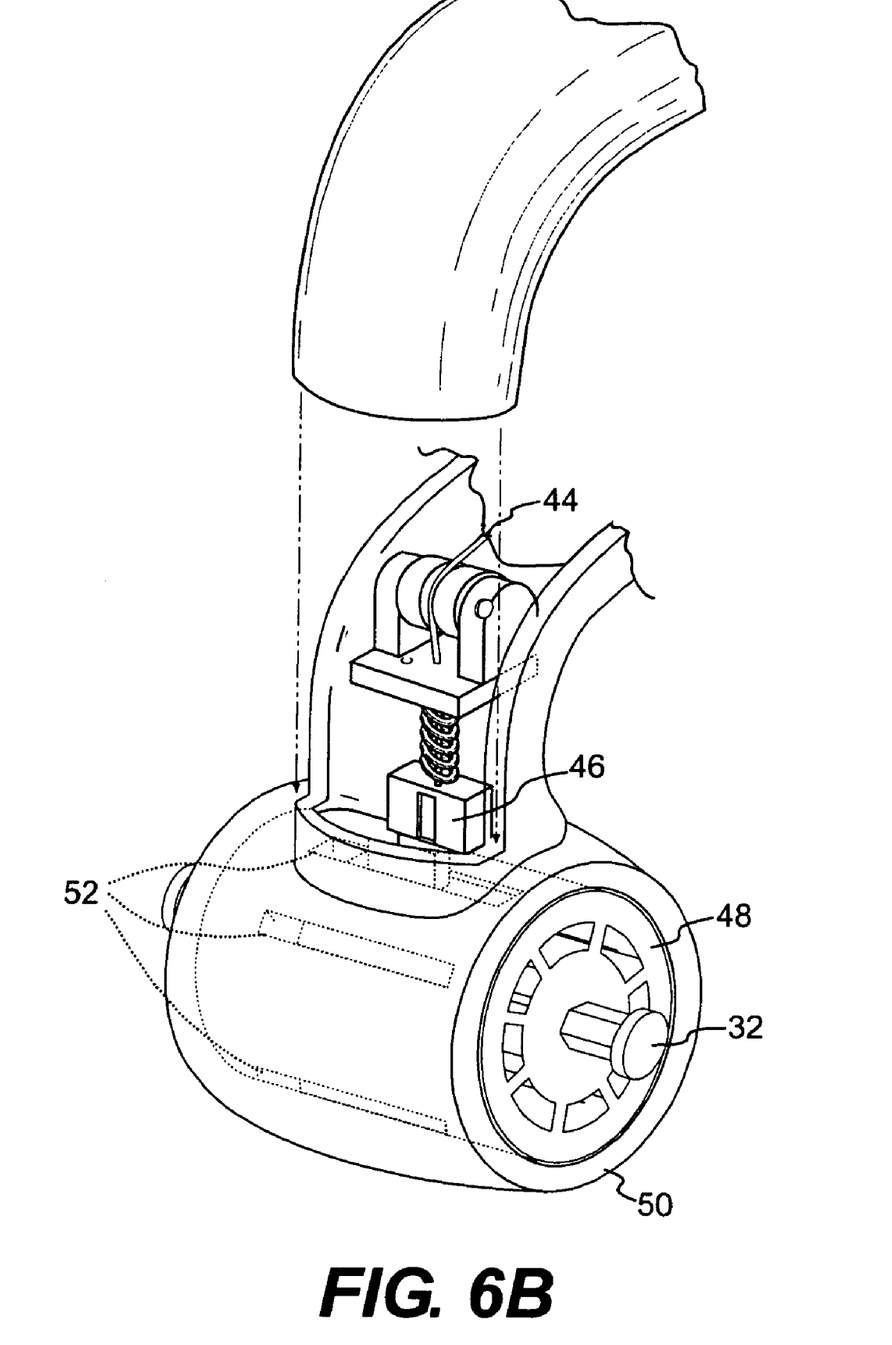

The handle grip, 12, is in a substantially T shape, starting with a T-shaped end, 30, that extends to where it makes an approximately 90° bend and attaches to the gooseneck base, 28, by means of rods, 32, attached to a hinge (see FIG. 6B for a depiction of the hinge). On the handle grip, 12, a hinge release button, 34, is located. The hinge release button, 34, may be located as depicted in the Figures (at the bottom of the T-shaped end, 30, of the handle grip, 12) or it may be located elsewhere on the handle grip, 12. The T shape of the handle grip, 12, allows the user to grip the handle grip, 12, in a variety of manners, depending on what is most comfortable for the user. The handle grip, 12, may be gripped with the palm facing down, grasping on to the T-shaped end, 30, with the fingers spread around the handle grip base, 36; or with the palm facing up, grasping on to the T-shaped end, 30, with the fingers spread around a handle grip base, 36; or with the palm facing down, grasping on to the handle grip base, 36, with a fist.

FIG. 6A depicts one means by which the hinge release button, 34, when pushed, releases the hinge. Other means envisioned by one of skill in the art of accomplishing this task are encompassed by the present invention. As depicted in FIG. 6A, when the hinge release button, 34, is depressed, it causes a compression of a spring, 38, and subsequently pulls a rod, 40, towards the tip of the handle. The rod, 40, then pulls a box housing, 42, which counterpulls a wire, 44. As shown in FIG. 6B, the wire, 44, pulls a gear pin, 46, which releases it from a gear box, 48, located within a gear box housing, 50. The gear box, 48, has gear pin notches, 52, into which the gear pin, 46, fits to lock the gear box, 48, in place. These gear pin notches, 52, are located at positions on the gear box, 46, such that when the gear pin, 46, engages a gear pin notch, 52, the handle grip will be in a position convenient for use. For example, gear pin notches, 52, may be located at approximately 12 o'clock (allowing the handle grip to be locked at an approximately 180° angle to the telescoping tube), 2 o'clock (allowing the handle grip to be locked at approximately a 120° angle to the telescoping tube) and/or 6 o'clock (allowing the handle grip to be locked at approximately a 0° angle to the telescoping tube), in the gear box, 48, or at any other position that will allow the handle grip to be locked in a position convenient for use.

The handle grip, 12, has a cover, 54, that protects the internal components of the handle grip, 12. In an alternative embodiment, the internal components of the handle grip (i.e. the spring, 38; rod, 40; box housing, 42; wire, 44; and gear pin, 46), may be located in the handle grip cover, 54, which is then snapped on to a handle grip bottom, 56, which is molded to the gear box housing, 50. The "hinge" is thus comprised of the gear pin, 46, and the gear box, 48. The handle grip, 12, is connected to the gooseneck base, 28, by rods, 32, that lock into the sides of the gear box, 48.

If desired, the handle grip, 12, may have finger grooves or other means to assist the user in gripping the handle. The cross-section of the handle is preferably circular, oval, or rectangular with rounded corners, and will provide a good fit between the handle and the user's hand, will prevent unwanted rotation of the handle therein, and will give the user a sense of the orientation of the handle. Preferably, the length of the grip portion of the handle grip, 12, is sufficient to allow the largest user to use a closed fist grip that is formed with all fingers and thumb; normally a four inch or longer grip area length is sufficient.

Figure 2:
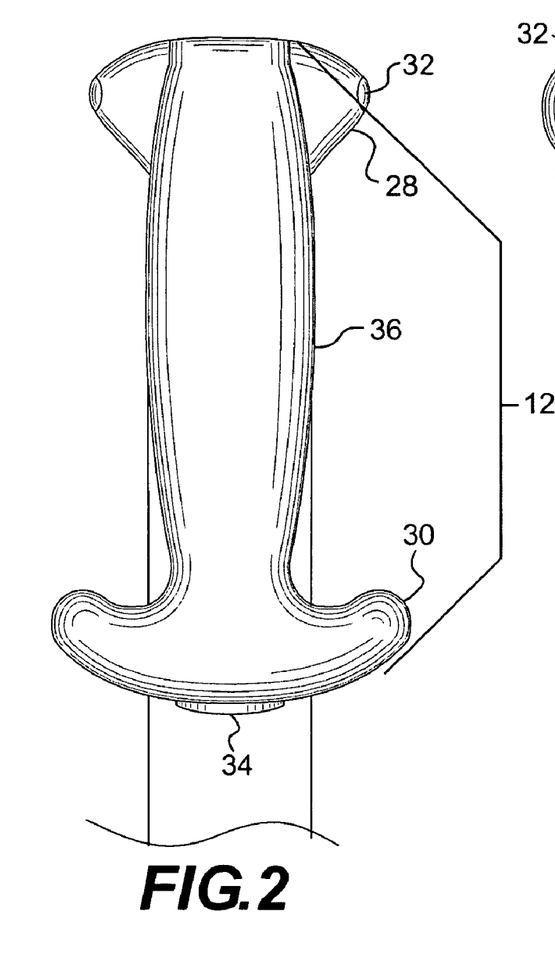
FIG. 2 illustrates a front view of the handle grip and the gooseneck base of the ergonomic telescoping handle assembly of one embodiment of the present invention.
Figure 3:
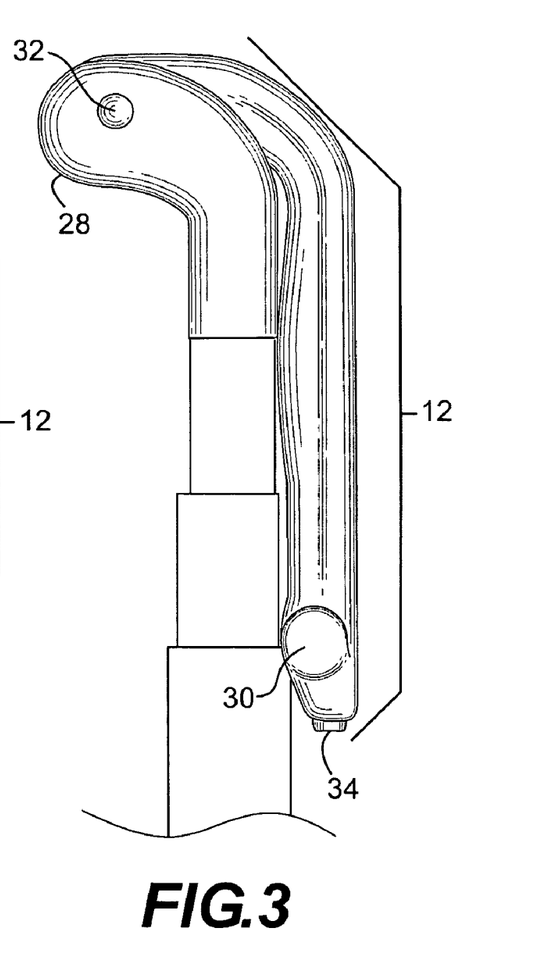
FIG. 3 illustrates a side view of the handle grip and the gooseneck base of the ergonomic telescoping handle assembly of one embodiment of the present invention.
Figure 4:
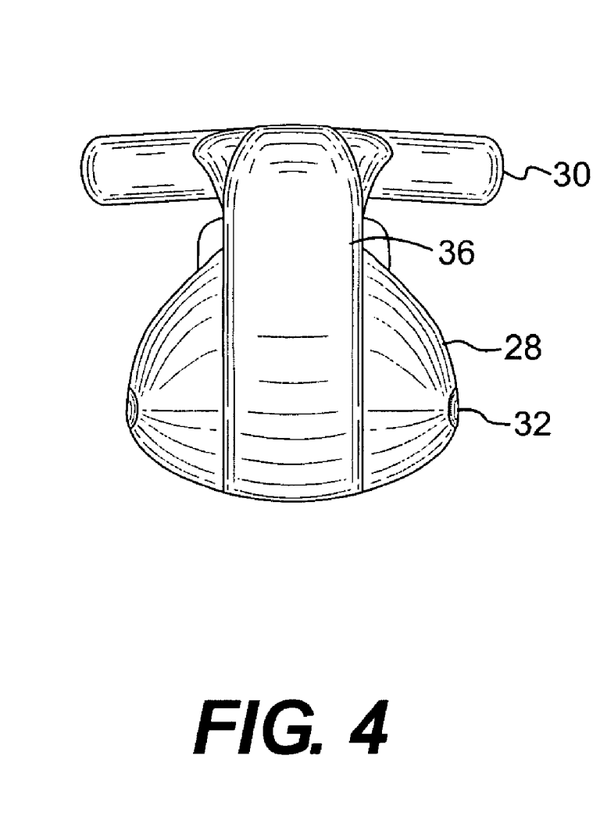
FIG. 4 illustrates a top view of the handle grip and the gooseneck base of the ergonomic telescoping handle assembly of one embodiment of the present invention.
Figure 5:
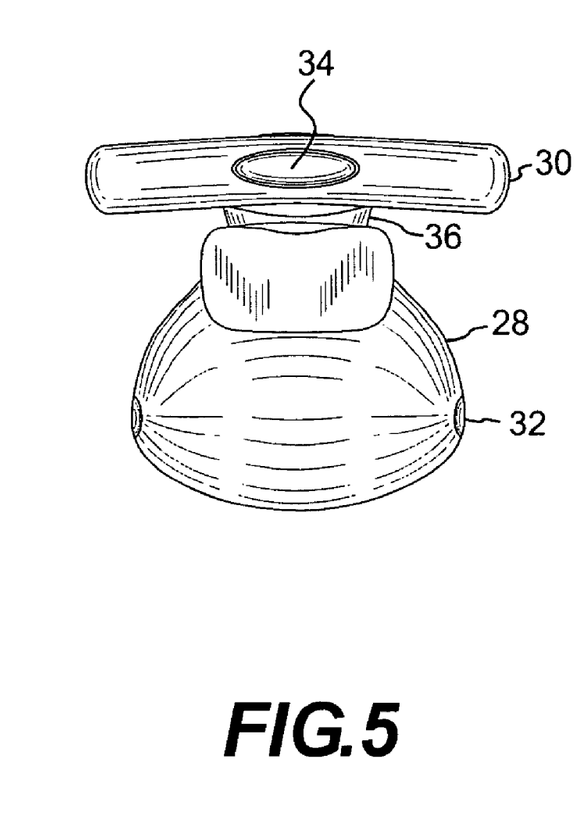
FIG. 5 illustrates a bottom view of the handle grip and the gooseneck base of the ergonomic telescoping handle assembly of one embodiment of the present invention, showing the handle release button.

FIG. 2 shows a front view; FIG. 3 shows a side view; FIG. 4 shows a top view; and FIG. 5 shows a bottom view of one embodiment of the handle grip, 12, showing the gooseneck base, 28, and the rods, 32, that attach the gooseneck base, 28, to the handle grip, 12, by locking into the sides of the gear box, 48 (see FIG. 6B).

Figure 7:
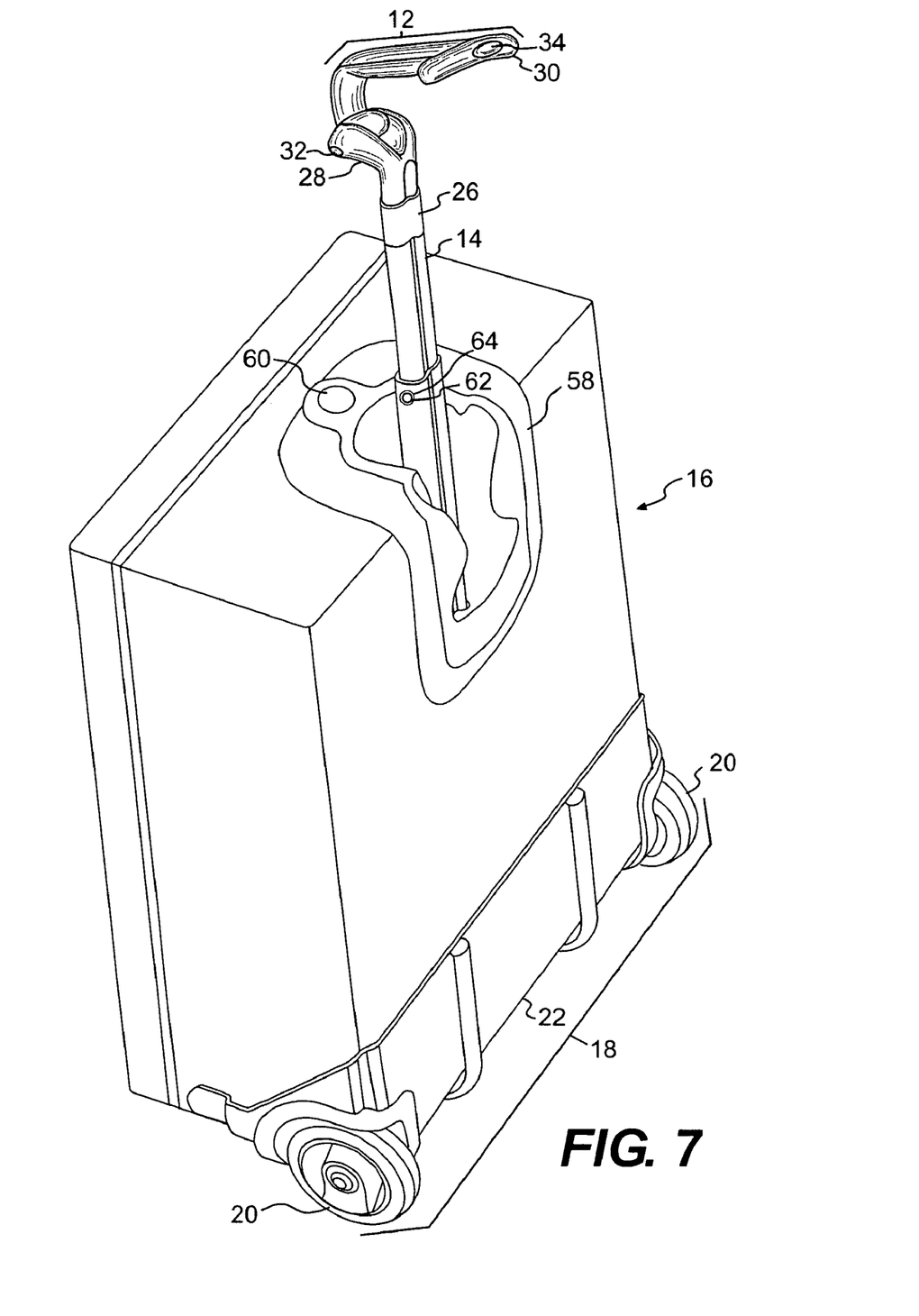
FIG. 7 illustrates one embodiment of the wheeled luggage of the present invention with the ergonomic telescoping handle assembly, wherein the telescoping tubes are in a fully up position, and the handle grip is positioned perpendicular to the telescoping tubes.

FIG. 7 depicts a preferred embodiment of the wheeled luggage item, 16, in which the handle grip, 12, is locked such that it is positioned approximately parallel to the ground. This is the position in which the handle grip, 12, is intended to be used to provide the most comfortable use to the user. In this position, and with reference to FIG. 6B, the gear pin, 46, is locked into the gear pin notch, 52, located at the 2 o'clock position on the gear box, 48.

Figure 8:
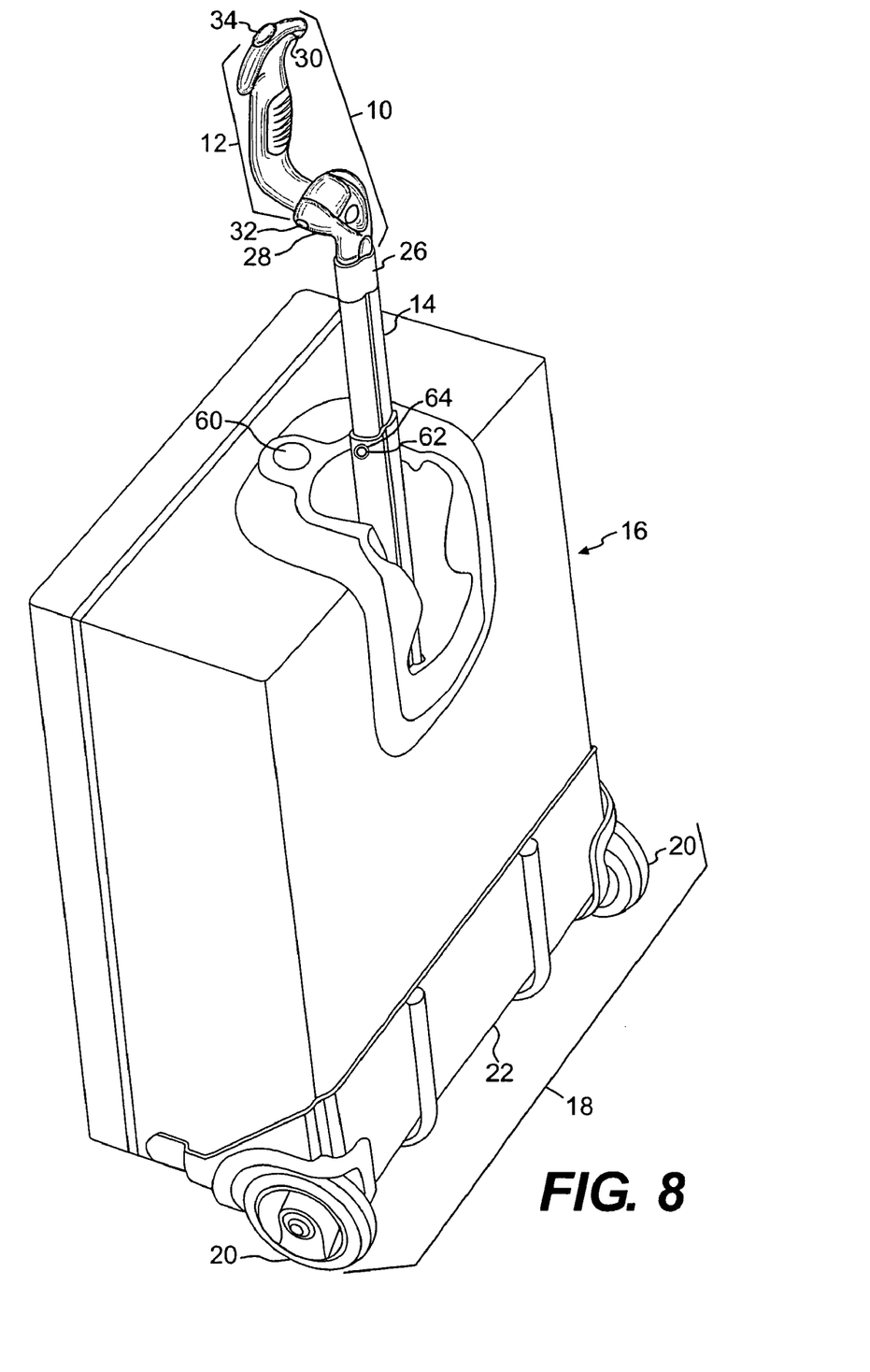
FIG. 8 illustrates one embodiment of the wheeled luggage of the present invention with the ergonomic telescoping handle assembly, wherein the telescoping tubes are in a fully up position, and the handle grip is in a fully upright position, parallel to the telescoping tubes.

FIG. 8 depicts a preferred embodiment of the wheeled luggage item, 16, in which the handle grip, 12, is locked such that it points straight up from the telescoping tubes, 14 (approximately parallel to the telescoping tubes, 14). The handle grip, 12, would assume this position if the handle grip, while in use and locked into the 2 o'clock position (as depicted in FIG. 7), were to fall onto the ground. On impact, and with reference to FIG. 6B, the hinge release button, 34, would compress, ultimately resulting in the gear pin, 46, releasing itself from the gear pin notch, 52, located at the 2 o'clock position on the gear box, 48, and re-positioning itself into the gear pin notch, 52, located at the 12 o'clock position on the gear box, 48. By doing this, damage to the handle grip, 12, and its hinge is prevented.

Figure 9:
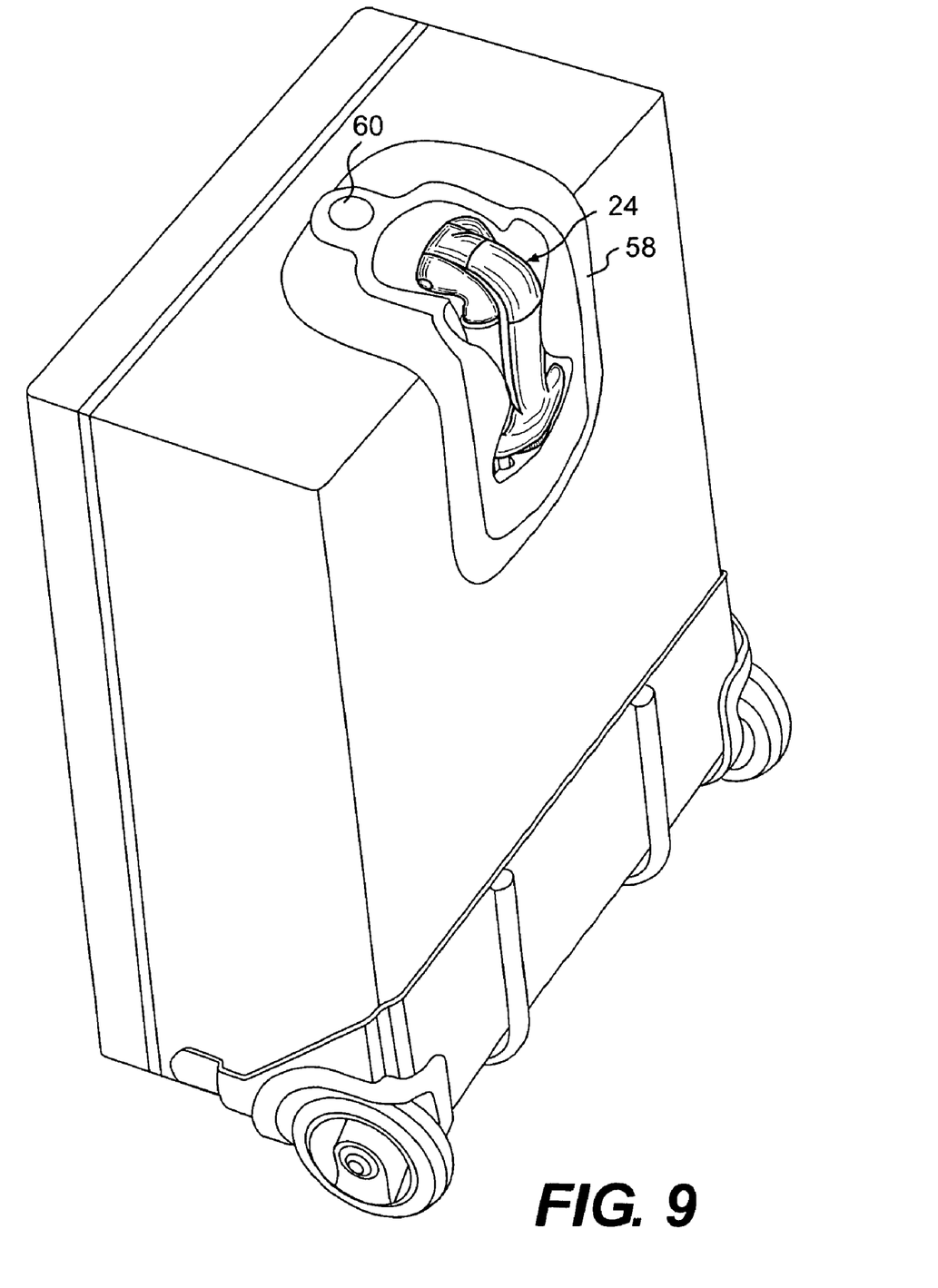
FIG. 9 illustrates one embodiment of the wheeled luggage of the present invention with the ergonomic telescoping handle assembly, wherein the telescoping tubes are stored within the luggage, and the handle grip is in the down position and stored within the handle grip housing.

FIG. 9 depicts the wheeled luggage item, 16, in which the handle grip, 12, is locked such that it points straight down, parallel to and resting next to the telescoping tubes, 14, and wherein the telescoping tubes, 14, are in the fully down position, such that the handle grip, 12, is stored within a telescoping handle assembly housing, 58. Although it is preferred that the handle grip, 12, be locked into this position (by the presence of the gear pin notch, 52, on the gear box, 48, at the 6 o'clock position, into which the gear pin, 46, is engaged) it is envisioned that the handle grip, 12, may not be locked into place (i.e. no gear pin notch, 52, at the 6 o'clock position on the gear box, 48).

With reference to FIG. 9, depicting a preferred embodiment of the present invention, the user would push a telescoping handle assembly release button, 60, located on top of the wheeled luggage item, 16. The location of the telescoping handle assembly release button, 60, on top of the wheeled luggage item, 16, is exemplary, and it is envisioned that the telescoping handle assembly release button, 60, may be located at any convenient place on the wheeled luggage item, 16. In an alternative embodiment, there would be no handle assembly release button, and instead the user would grab the top of the ergonomic telescoping handle assembly, 24, from the cavity in the luggage in which it is stored, and pull up on it.

When the telescoping handle assembly release button, 60, is pushed, the at least one telescoping tube, 14, pops up (but does not yet lock into place). The wheeled luggage item, 16, would then appear as depicted in FIG. 1. The consumer would then grab the handle grip, 12, and push the hinge release button, 34, located on the T-shaped end, 30, of the handle grip, 12. This allows the consumer to release the handle grip, 12, from its locked position and move it to the approximately 2 o'clock position for use. Simultaneously, the user would pull up on the handle grip, 12, which would extend the at least one telescoping tube, 14, locking telescoping tube pins, 62, into telescoping tube pin holes, 64 (see FIG. 7 for a depiction of the wheeled luggage item, 16, with the handle grip, 12, at the approximately 2 o'clock position, and the telescoping tubes, 14, locked in an up position). In the embodiment shown, there are two telescoping tubes, 14—the top telescoping tube having a set of telescoping tube pins, 62, and the bottom telescoping tube having a set of corresponding telescoping tube pin holes, 64. Although not shown, in this embodiment there may also be at least one stable tube within the luggage with telescoping tube pin holes into which would lock telescoping tube pins located on the bottom telescoping tube. In an alternative embodiment, there would be just one telescoping tube, 14, with one set of telescoping tube pins, 62, that would lock into telescoping tube pin holes, 64, located in a stable tube within the luggage (not seen by the user) within which the one telescoping tube, 14, moves. In an alternative embodiment, the at least one telescoping tube, 14, would have one set of telescoping tube pins, 62, and two or more sets of telescoping tube pin holes, 64, located on either a second telescoping tube (into which the first telescoping tube would fit and move vertically) or on a stable tube located within the luggage. This would allow the at least one telescoping tube, 14, to be adjusted to various heights. Many alternative embodiments of the at least one telescoping tube 14 would be envisioned by one of skill in the art.

When the user is finished using the wheeled luggage item, and would like to store the telescoping handle assembly, 24, the user would once again push the hinge release button, 34, located on the T-shaped end, 30, of the handle grip, 12. This will allow the user to move the handle grip, 12, from either the 12 o'clock position or the 2 o'clock position down to the 6 o'clock position. When the handle grip, 12, is in the 6 o'clock position, it presses on the telescoping tube pin release button, 26 (see FIG. 1). The presence of a telescoping tube pin release button, 26, is optional, and other means of releasing the telescoping tube pins from their respective telescoping tube pin holes would be envisioned by one of skill in the art (such as the user pressing the telescoping tube pins directly), and are encompassed by the present invention. Furthermore, the location of the telescoping tube pin release button, 26, between the at least one telescoping tube, 14, and the gooseneck base, 28, of the handle grip assembly, 10, although preferred, is not necessary. The compression of the telescoping tube pin release button, 26, releases the telescoping tube pins, 62, from the telescoping tube pin holes, 64.

Once the telescoping tube pin release button, 26, is compressed (or the release of the telescoping tube pins from the telescoping tube pin holes is otherwise accomplished), the user will be able to push down on the top of the telescoping handle assembly, 24, storing it in the telescoping handle assembly housing, 58, flush with both the top surface and the back surface of the wheeled luggage item, 16. As can be seen, the user should easily be able to perform each of these functions with just one hand—pushing the telescoping handle assembly release button to release the telescoping handle assembly; pushing the hinge release button to move the handle grip; pulling the telescoping tubes to their fully upright position; pushing the hinge release button to move the handle grip down to its storage position; and pushing on the telescoping handle assembly to store it in the telescoping handle assembly housing.

Although not shown, the telescoping handle assembly housing, 58, can also be closed or sealed over with a zippered or Velcro®-type of hook and loop fastener covering when the handle assembly is not being used in order to prevent the handle assembly from opening and/or being damaged during baggage handling. The wheeled luggage item, 16, may also be equipped with a conventional carry handle mounted on the top or side surface of the luggage item body.

Figure 10:
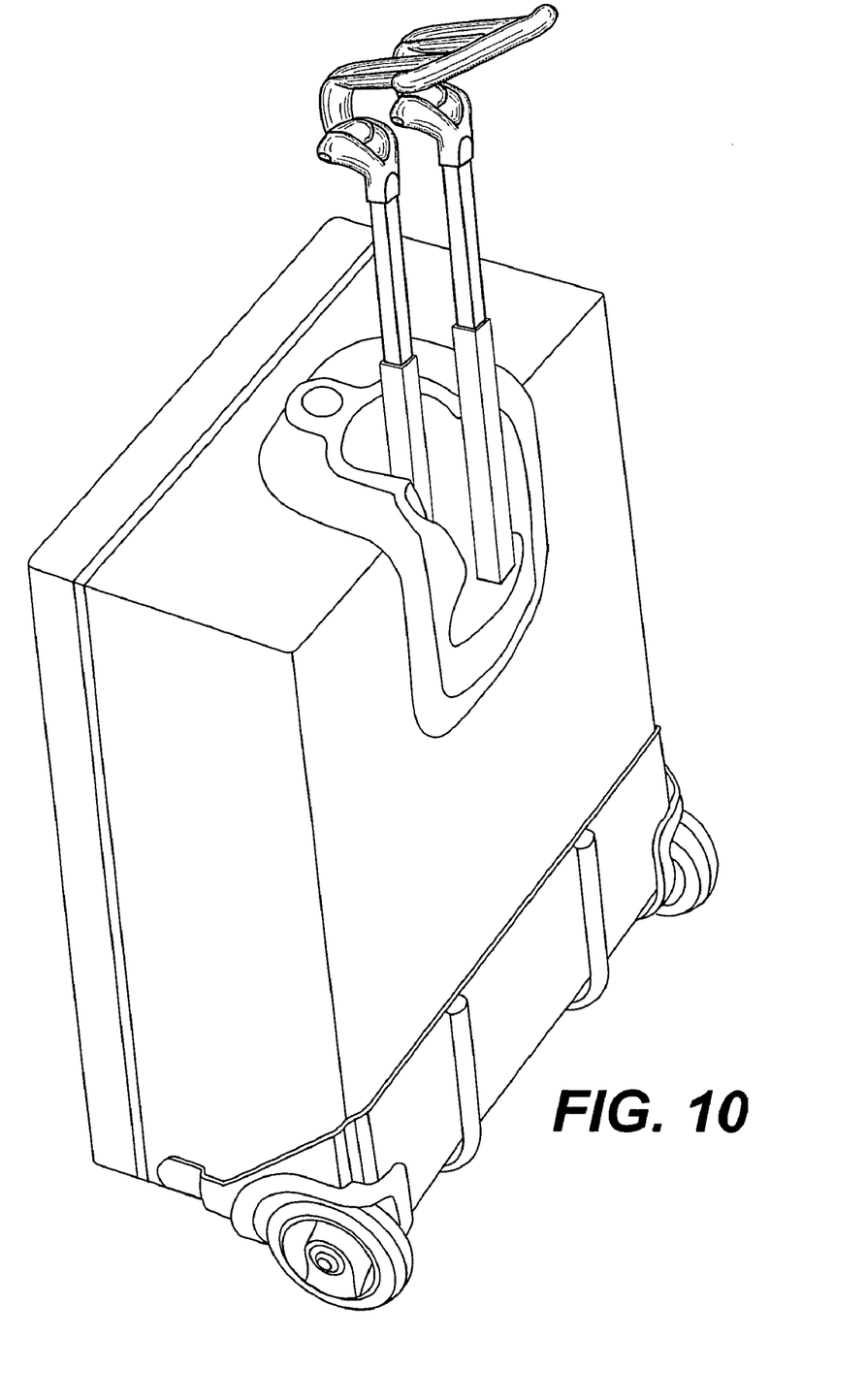
FIG. 10 illustrates a second embodiment of the wheeled luggage of the present invention with the ergonomic telescoping handle assembly, wherein there are two sets of telescoping tubes and a U-shaped handle connecting the two sets.

In an alternative embodiment, the telescoping handle assembly may be comprised of two sets of at least one telescoping tube (see FIG. 10). As in the above embodiment, on top of each set of telescoping tubes would be located the gooseneck bases for the handle grip assembly. The handle grip would be in the approximate shape of a U, with each of the tops of the U attached via a hinge to one of the gooseneck bases. The telescoping handle assembly of this embodiment would work similarly to the one described above—the user would push a telescoping handle assembly release button which would release the telescoping handle assembly from its stored position (alternative means of releasing the telescoping handle assembly from its stored position are envisioned and encompassed by the present invention); the user then would push a hinge release button located on the bottom of the U-shaped handle grip, which would release the handle grip from its locked position and move it to the approximately 2 o'clock position (alternative means of releasing the handle grip from its locked position are also envisioned, and are encompassed by the present invention). When the user would like to store the telescoping handle assembly, he would push the hinge release button and fold the handle grip down. In one embodiment, the handle grip, when folded down, will then compress two telescoping tube pin release buttons (one button located between each of the two sets of at least one telescoping tube and each of the gooseneck bases), which will release the telescoping tube pins and allow the telescoping handle assembly to be pushed down into the telescoping handle assembly housing. Alternative means of releasing the telescoping tube pins from the telescoping tube pin holes are also envisioned, and are encompassed by the present invention. In yet another alternative embodiment, the handle grip would be in the approximate shape of a Y, with each of the tops of the Y attached via a hinge to one of the gooseneck bases, and the base of the Y being T-shaped, providing alternative means for gripping onto the handle assembly (as in the preferred embodiment).

Although several embodiments of the invention have been disclosed in the present specification, it is understood by those skilled in the art that many modifications and other embodiments of the invention will come to mind as a benefit of the teaching presented in the description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention or the claims which follow.

We claim:

1. A luggage item comprising:
   a container substantially in the shape of a rectangle including a front side, a back side, a left side, a right side, a top and a bottom surface,
   a wheel assembly, and
   an ergonomic telescoping handle assembly coupled to the container, the ergonomic telescoping handle assembly comprising at least one telescoping tube extendible from the top surface of the container, a handle grip assembly gooseneck base coupled to the top of the telescoping tube; and a handle grip coupled to the gooseneck base by a hinge, wherein said handle grip is in a substantially T shape, with the base of the T coupled to the gooseneck base via the hinge, and further wherein the gooseneck base allows for the handle grip to be stowed at an approximately 6 o'clock position, flush within the luggage, and wherein said hinge allows for the handle grip to pivot into at least one selectable engageable fixed position, and enables ergonomically comfortable gripping by the hand of a user of the luggage item for enabling the luggage item to be moved via the wheel assembly.

2. The luggage item of claim 1, wherein said handle grip is pivotable to a fixed position which is at an approximately 120° angle to the telescoping tube.

3. The luggage item of claim 1, wherein said handle grip is pivotable into at least two selectable engageable positions, with the second position being a fixed position which is at an approximately 180° angle to the telescoping tube.

4. The luggage item of claim 1, wherein said handle grip is pivotable into at least two selectable engageable positions, with the second position being a fixed storage position which is at an approximately 0° angle to the telescoping tube.

5. The luggage item of claim 1, wherein said container comprises an ergonomic telescoping handle assembly housing that allows the ergonomic telescoping handle assembly to be stored substantially flush with the outside of the container.

6. The luggage item of claim 5, wherein said ergonomic telescoping handle assembly housing comprises a telescoping handle assembly release button on the top of said housing that, when pressed, releases the ergonomic telescoping handle assembly from said housing.

7. The luggage item of claim 1, wherein said ergonomic telescoping handle assembly further comprises a hinge release button.

8. The luggage item of claim 7, wherein said hinge release button is located on the handle grip.

9. The luggage item of claim 7, wherein said hinge release button, when pressed, compresses a spring within the handle grip, which in turns moves a rod toward the hinge release button, which in turn moves a box housing towards the hinge release button, which in turn counterpulls a wire attached to a gear pin locked into a gear box, releasing the gear pin from the gear box and allowing the user to re-position the handle grip.

10. The luggage item of claim 1, wherein said at least one telescoping tube comprises at least one telescoping tube pin.

11. The luggage item of claim 10, wherein said ergonomic telescoping handle assembly further comprises a telescoping tube pin release button between said at least one telescoping tube and said gooseneck base.

12. The luggage item of claim 11, wherein said ergonomic telescoping handle assembly further comprises at least one telescoping tube pin hole, wherein when said at least one telescoping tube pin is locked into said at least one telescoping tube pin hole, the user can fold down the handle grip by pressing the hinge release button, thereby pressing the telescoping tube pin release button, and releasing the at least one telescoping tube pin from the at least one telescoping tube pin hole.

13. The luggage item of claim 11, wherein said ergonomic telescoping handle assembly further comprises at least one telescoping tube hole, wherein when said user of the luggage pulls up on the telescoping handle assembly, said at least one telescoping tube pin will lock into the first set of telescoping tube pin holes it comes to.

14. The luggage item of claim 1, wherein the ergonomic telescoping handle assembly further comprises a stable tube within the luggage, into which said at least one telescoping tube moves vertically.

15. The luggage item of claim 14, wherein said at least one telescoping tube comprises at least one telescoping tube pin, and said at least one stable tube comprises at least one telescoping tube pin hole.

* * * * *